United States Patent
Eslambolchi et al.

[11] Patent Number: 5,967,079
[45] Date of Patent: Oct. 19, 1999

[54] SURFACE MARKING DEVICE AND METHOD

[75] Inventors: Hossein Eslambolchi, Basking Ridge, N.J.; John Sinclair Huffman, McDonough, Ga.

[73] Assignee: AT&T Corp., New York, N.Y.

[21] Appl. No.: 09/030,974

[22] Filed: Feb. 26, 1998

[51] Int. Cl.⁶ ..................................................... G08B 5/00
[52] U.S. Cl. ........................................... 116/211; 116/209
[58] Field of Search ..................................... 116/211, 209, 116/203, 200, 201, DIG. 14; 405/157; 473/577; 102/448, 502, 513

[56] References Cited

U.S. PATENT DOCUMENTS

| | | | |
|---|---|---|---|
| 3,115,861 | 12/1963 | Allen | 116/211 |
| 3,221,428 | 12/1965 | Fischler et al. | 116/200 |
| 3,581,703 | 6/1971 | Hosack | 116/DIG. 14 |
| 4,415,603 | 11/1983 | Valiot et al. . | |
| 4,623,282 | 11/1986 | Allen | 116/DIG. 14 |
| 4,932,672 | 6/1990 | Tippmann . | |
| 4,951,055 | 8/1990 | Katayama . | |
| 5,001,880 | 3/1991 | Smith . | |
| 5,017,415 | 5/1991 | Cosman et al. . | |
| 5,017,873 | 5/1991 | Rippingale et al. . | |
| 5,018,450 | 5/1991 | Smith . | |
| 5,122,750 | 6/1992 | Rippingale et al. . | |
| 5,254,379 | 10/1993 | Kotsiopoulos et al. . | |
| 5,361,029 | 11/1994 | Rider et al. . | |
| 5,393,054 | 2/1995 | Rouffer . | |
| 5,557,258 | 9/1996 | Eslambolchi . | |
| 5,576,973 | 11/1996 | Haddy . | |
| 5,590,886 | 1/1997 | Lush . | |
| 5,633,589 | 5/1997 | Mercer . | |
| 5,639,526 | 6/1997 | Kotsiopoulos et al. . | |
| 5,644,237 | 7/1997 | Eslambolchi et al. | 324/326 |

*Primary Examiner*—Andrew Hirshfeld
*Attorney, Agent, or Firm*—Robert B. Levy

[57] ABSTRACT

A device (10) for marking the ground above a buried conveyance includes an upper and lower shells (12, 14) of a fracturable material joined at their edges to form a sealed body. A separator layer (16) devises the void between the two shells into an upper and lower regions (18, 20). The lower region contains a paint-adhesive mixture (22), whereas the upper region contains an indicia-bearing member (26) that identifies the entity responsible for the buried conveyance. To mark the buried conveyance, a technician deposits the marking device (10) on the ground and then steps on it, thereby fracturing the upper and lower shells to release the paint-adhesive mixture and the indicia-bearing member for adherence to the ground by the adhesive.

12 Claims, 1 Drawing Sheet

SURFACE MARKING DEVICE AND METHOD

TECHNICAL FIELD

This invention relates to a method and apparatus for visually marking the ground above a buried utility conveyance to alert those would excavate of the presence of the conveyance.

BACKGROUND ART

Utilities that provide gas, electric, water, and/or telephone service bury their conveyances (e.g., pipes and/or cables) underground, both for reasons of safety and aesthetics. Where appropriate, such utilities often provide one or more visual markers along the conveyance right-of-way, alerting those who might potentially excavate of the presence of such a buried conveyance. In some instances, a utility cannot place a sign or marker everywhere along the right-of-way of a buried utility conveyance. Instead, the utility must rely on regulations implemented by many jurisdictions that require contractors contact a central registry for buried utility conveyance information prior to excavation. Contractors that call the central registry receive information identifying buried conveyances in the area of desired excavation. Since the conveyance identity information is often general in nature, most utilities, in response to an inquiry received via the central registry, will dispatch one or more technicians to physically pin-point the buried conveyance to avoid damage by excavation.

Presently, most utilities utilize a radio frequency signaling detection technique to locate buried underground conveyances that carry a locating signal. U.S. Pat. No. 5,644,237, issued Jul. 1, 1997, in the names of Hossein Eslambolchi and John S. Huffman, and assigned to AT&T, discloses a radio frequency signaling detection apparatus for locating buried conveyances. After a utility technician locates a buried conveyance, the technician typically marks the ground above the buried conveyance using a biodegradable paint for this purpose. Different colors are employed to designate different types of conveyances. Telephone service providers typically use orange paint to designate buried telephone cables while gas, water and electric utilities use yellow, blue, and red to designate buried gas, water, and electric conveyances, respectively.

To mark the location of a buried conveyance, the utility technician carries a power paint cartridge or spray can to apply the appropriate color paint. In practice, most utility technicians find it awkward to actuate the power paint cartridge or spray can while using present day radio frequency location equipment. Moreover, even when the technician is able to actuate the paint cartridge or spray can, the resultant color marking, while identifying the type of conveyance, provides no information as to the particular utility responsible for the conveyance.

Thus, there is a need for a technique that allows a utility technician to readily mark the ground above a buried conveyance in a manner that both designates its nature, as well as the entity responsible for its maintenance.

BRIEF SUMMARY OF THE INVENTION

Briefly, the present invention comprises a surface marking device that enables a person, such as a utility technician, to mark a buried utility conveyance to identify both its type and the entity responsible for the conveyance. The surface marking device comprises a sealed pouch made from a low burst strength material, such as a biodegradable polystyrene or the like. The pouch has a divider that divides its interior into upper and lower portions. The lower portion of the pouch contains a mixture of paint and adhesive, both of which are biodegradable. The color of the paint corresponds to the color designated for marking a particular type of buried conveyance. The upper portion of the pouch contains a member, typically in the form of a ribbon or flag, that bears indicia identifying the entity responsible for the buried conveyance.

A utility technician seeking to mark the ground above a buried conveyance with the marking device of the invention simply drops the marking device on the ground. Thereafter, the technician then steps on the pouch, thereby fracturing it to release the paint and adhesive so the paint provides a visual indication of the nature of the identity. When the technician steps of the pouch, the technician also fractures the upper portion, releasing the indicia-bearing member. The adhesive mixed with the paint adheres the indicia-bearing member to the ground with the paint to identify the entity responsible for the buried conveyance.

DETAILED DESCRIPTION

Figure 1:
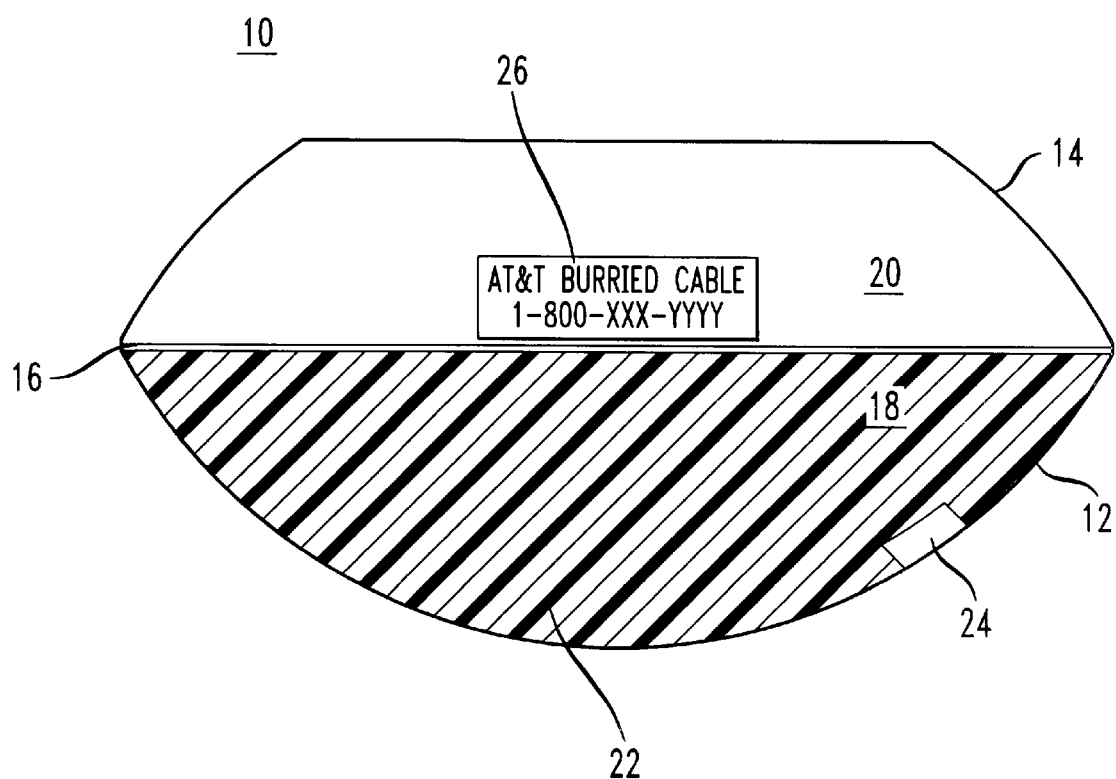
FIG. 1 is a perspective view of the surface marking device of the invention.

FIG. 1 illustrates a surface marking device 10 in accordance with a preferred embodiment of the invention. The device 10 comprises a bladder or pouch comprised of upper and lower shells 14 and 12 respectfully, that are generally hemispherical or elliptical in shape. The upper and lower shells 14 and 12 are manufactured from an plastic material that has a relatively low burst strength and is biodegradable. For example, the upper and lower shells could comprise a rigid polystyrene, or a pliable film. Typically, the upper shell 14 is generally transparent, or at least sufficiently light transmissive to allow viewing therethrough.

In manufacturing the marking device 10, the upper and lower shells 12 and 14 are joined at their edges, typically by welding or by use of an adhesive forming a sealed body. A separating layer 16 divides and hermetically separates the interior void within the device 10 upon joining the two shells 12 and 14, thus creating an upper and lower regions 20 and 18, respectfully. The lower region 18 of the surface marking device 10 contains a liquid volume of a paint and adhesive mixture 22. Both the paint and adhesive are biodegradable. The paint color corresponds to the nature of the buried utility conveyance marked by the surface marking device. Traditionally, telephone service providers typically use orange paint to designate buried telephone lines while gas, water and electric utilities employ yellow, blue, and red paint to designate buried gas, water, and electric conveyances, respectively. The lower shell 12 has a re-sealable port 24 through which the paint-adhesive mixture 22 is admitted to the lower region 18.

As discussed, the separating layer 16 separates the upper and lower regions 18 and 20, thus keeping the adhesive-paint mixture 22 from entering the upper region. In accordance with a preferred embodiment of the invention, the upper region 20 contains an indicia-bearing member 26, typically in the form of a flag or ribbon, whose indicia identifies the entity responsible for the buried conveyance marked by the surface marking device 10. As illustrated in FIG. 1, for a buried conveyance maintained by AT&T, the member 26 would list AT&T as the responsible entity, and would typically provide a telephone number, (e.g., a toll-free number) for contact. Although not shown in FIG. 1, the indicia-bearing member 26 could contain other information, such as the identity and type of conveyance. In addition to the alphanumeric information contained on the member 26 shown in FIG. 1, the member could also contain other indicia, such as a barcode or other machine readable code.

In the manufacture of the surface marking device 10, the separator layer 16 is typically joined at its edges to the upper edges of the lower shell 12 prior to the admission of the paint-adhesive mixture 22. The indicia-bearing member 26 is placed within the upper region 20 and the edges of the upper shell 14 are joined to the edges of the separator layer 16 and the lower shell 12. Alternatively, the indicia-bearing member 26 could be placed on the separator layer 26 prior to joining the edges of the separator layer to the edges of the lower shell 12.

A technician utilizes the surface marking device 10, manufactured in the manner described, to mark the ground above a buried conveyance in the following manner. First, the technician places the surface marking device 10 on the ground. Generally, the weight of the paint-adhesive mixture 22 will maintain the marking device 10 in a "face-up" condition whereby the upper region 20 lies above the lower region, 18 even if the technician throws the marking device from a height of several feet. After depositing the surface marking device 10 on the ground, the technician steps of the device, thereby fracturing at least the lower shell 12 so that the paint-adhesive mixture 22 marks the earth. In practice, the upper region 20 is filled with air, or one or more other generally inert gases so that when the technician steps on the marking device 10, the upper shell 14 also fractures, exposing the indicia-bearing member 26 for adherence to the ground by the adhesive in the paint-adhesive mixture 22.

The foregoing describes a surface marking device 10 for visually marking the ground with both paint of an appropriate color, as well as a indicia-bearing member 26 that specifically identifies the utility responsible for the buried conveyance.

The above-described embodiments merely illustrate the principles of the invention. Those skilled in the art may make various modifications and changes that will embody the principles of the invention and fall within the spirit and scope thereof.

What is claimed is:

1. A surface marking device for visually marking the ground above a buried conveyance, comprising:

a body formed of a fracturable material and including first and second interior regions separated from each other by a separating layer;

a mixture of paint and adhesive contained in the first region; and an indicia-bearing member contained within the second region, wherein the body, when fractured, releases the paint and adhesive mixture to mark the ground and exposes the indicia-bearing member for adherence to the ground by the adhesive within the paint adhesive mixture.

2. The surface marking device according to claim 1 wherein the paint is of a color for designating a particular type of buried conveyance.

3. The surface marking device according to claim 2 wherein the paint color is orange and said conveyance is a buried telephone conveyance.

4. The surface marking device according to claim 2 wherein the paint color is yellow and said conveyance is a buried gas conveyance.

5. The surface marking device according to claim 2 wherein the paint color is blue and said conveyance is a buried water conveyance.

6. The surface marking device according to claim 2 wherein the paint color is red and said conveyance is a buried electrical conveyance.

7. The surface marking device according to claim 1 wherein the indicia-bearing member includes indicia identifying an entity responsible for the buried conveyance.

8. The surface marking device according to claim 7 wherein the indicia-bearing member includes a telephone number associated with the entity responsible for the buried conveyance.

9. The surface marking device according to claim 1 wherein the fracturable material forming the body is biodegradable.

10. The surface marking device according to claim 1 wherein at least a portion of the fracturable material forming the body is generally transparent to expose the indicia-bearing member.

11. A method for visually marking the ground above a buried conveyance, comprising the steps of:

depositing on the ground a surface marking device comprised of a body formed of a fracturable material and including first and second interior regions separated from each other by a separating layer; a mixture of paint and adhesive contained in the first region; and an indicia-bearing member contained within the second region; and fracturing the body to release the paint and adhesive mixture to mark the ground and expose the indicia-bearing member for adherence to the ground by the adhesive within the paint adhesive mixture.

12. The method according to claim 11 wherein the body of the marking device is fractured by foot pressure exerted by an individual stepping on the body.

* * * * *